United States Patent [19]

Koch et al.

[11] B 3,925,413

[45] Dec. 9, 1975

[54] PROCESS FOR THE PRODUCTION OF CYCLIC THIOCARBONATES

[75] Inventors: Paolo Koch, San Giuliano Milanese; Emilio Perrotti, S. Donato Milanese, both of Italy

[73] Assignee: Snamprogetti S.p.A., San Donato Milanese, Italy

[22] Filed: Oct. 1, 1973

[21] Appl. No.: 402,065

[44] Published under the Trial Voluntary Protest Program on January 28, 1975 as document no. B 402,065.

[30] Foreign Application Priority Data

Oct. 10, 1972 Italy................................. 30288/72

[52] U.S. Cl............................................ 260/327 M
[51] Int. Cl.²........................................ C07D 327/04
[58] Field of Search ............................... 260/327 M

[56] References Cited

UNITED STATES PATENTS 3,357,991  12/1967  Swakon............................. 260/327

*Primary Examiner*—Natalie Trousof
*Assistant Examiner*—C. M. S. Jaisle
*Attorney, Agent, or Firm*—Ralph M. Watson, Esq.

[57] ABSTRACT

The present invention relates to the production of cyclic thiocarbonates by reacting a thioglycol or a hydroxydisulphide with carbon oxide in presence of transition metals or transition metal compounds. The thiocarbonates are very important products from a practical point of view since some of them are precursors of the alkylene sulphides or episulphides which are widely employed in the production of polymers with peculiar properties.

5 Claims, No Drawings

PROCESS FOR THE PRODUCTION OF CYCLIC THIOCARBONATES

On the other hand it is known the episuphides are very unstable compounds, therefore they are difficultly stored and handled since they spontaneously polymerize according to an irregular way which gives rise to unusable products.

Therefore it is desired to have sulphur containing compounds available which are stable from a chemical point of view and can be carried and stored for a long time without any alteration of their characteristics, which furthermore are able to give rise to quantitative or nearly quantitative yields of the corresponding episulphides, through simple reactions, as they are used.

The cyclic thiocarbonates produced by the inventive process give rise, through a known pyrolysis reaction, to the corresponding alkylene episulphides with a contemporaneous $CO_2$ development.

For this purpose, many methods have been proposed for the production of episulphides from more stable sulphur containing compounds, but the practical realization thereof has till now been remarkably hindered by the high production cost of the precursor sulphur containing compounds. A simple and economic method has now been found to obtain the cyclic thiocarbonates, which are remarkably stable compounds and may be easily transformed into the corresponding episulphides.

The process according to the present invention consists in reacting a thioglycol or a hydroxydisulphide with carbon monoxide and oxygen in presence of catalysts constituted by compounds of metals selected among Mn, Fe, Co, Ni, Mo, Pd, Pt and Se.

Thioglycol or hydroxydisulphide may be selected from the ones having the general formula HO—A—SX wherein A is a divalent alkyl radical having from 2 to 5 carbon atoms, separating the oxygen and sulphur atoms by 2 carbon atoms, either linear or branched, X is a hydrogen atom or a radical —S—A—OH wherein A has the aforementioned meaning. Among the metal compounds which can be employed as catalysts an advantageous use can be made of the carbonyl compounds, i.e. the ones showing at least a CO group directly bound to the metal.

Use may be made also of other compounds which are able, in presence of CO, to give rise, at least partially, to carbonyl compounds. When, in the starting compounds, radical X is hydrogen, the reaction is carried out in presence of oxygen which allows the removal of hydrogen as water.

Among thioglycols and hydroxydisulphides usefully employable according to the present invention a mention can be made of thioethyleneglycol, thiopropyleneglycol, thioisopropyleneglycol, β-β'-hydroxyethylenedisulphide, β-β'-hydroxypropylenedisulphide.

As to the thioglycols the reaction runs out according to the scheme (1)
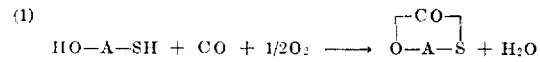

When use is made of hydroxydisulphides the reaction can be performed without oxygen according to the scheme (2)
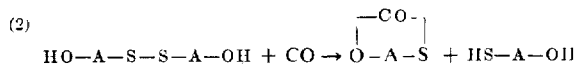

and thioglycol is obtained, which can be subjected to reaction 1), or the reaction is performed in presence of oxygen to give rise to two moles of thiocarbonate per mole of hydroxydisulphide (3)

The reactions according to 1), 2) and 3) are preferably carried out under a pressure ranging between 1 and 80 absolute atmospheres.

The reaction temperature ranges from room temperature to 100°C. Use may be made of very basic solvents selected among pyridine, dimethylformamide, dimethylsulphoxide or of solvents as tetrahydrofurane, dioxane, halogenated hydrocarbons, aromatic hydrocarbons and the like provided that, in the latter case, a base is present in an amount at least equimolecular with respect to the catalyst. The aliphatic tertiary amines and the aromatic ones are very suitable for this purpose.

As examples of catalysts useful for the invention a mention may be made of $Ni(CO)_4$, $Co_2(CO)_8$, $Fe(CO)_5$, $Mn(CO)_6$, $Se(CO)$ employed as such or formed in solution by reaction CO and the metal as in the use of $Se(CO)$. Without entering the reaction mechanism we think that the formation of cyclic thiocarbonates occurs through the formation of complexes between thioglycol or hydroxydisulphide and the catalytic compound: in fact some of these complexes have been isolated and identified by the Applicant. Then the aforesaid complexes react with carbon oxide to give the thiocarbonates and restore the catalyst.

The following examples illustrate the invention but are not limitative thereof.

EXAMPLE 1

A solution containing 2.3 mmoles of $Ni(CO)_4$ and 14 mmoles of 2-mercaptoethanol in 50 ml of pyridine was vigorously stirred at 60°C under a stream constituted by a CO and $O_2$ mixture, containing 18% by moles of $O_2$, at the total pressure of 3 kg/cm² (flow rate equal to 50 ml/h at normal conditions). The exhaust gases were continuously analyzed as to the presence of $O_2$. After 8 hours, 2 mmoles of $CO_2$ and 4.2 mmoles of ethylenethiocarbonate were formed on the whole, (the latter having been determined by I.R. analysis of 1745 cm⁻¹ band). The yield on reacted CO was 68%.

EXAMPLE 2

A solution containing 2.3 mmoles of $Ni(CO)_4$ and 14 mmoles of 2-mercaptoethanol in 50 ml of dimethylsulphoxide was vigorously stirred at 100°C under a stream constituted by a CO and $O_2$ mixture, containing 18% by moles of $O_2$, at the total pressure of 3.5 kg/cm². (Flow rate equal to 50 ml/h at normal conditions). 1 mmole of $CO_2$ and 6.7 mmoles of ethylenethiocarbonate were formed on the whole after 8 hours. The yield on reacted CO was 87%.

EXAMPLE 3

A solution containing 2.3 mmoles of Ni(CO)$_4$ and 10 mmoles of 2-mercaptopropanol in 50 ml of dimethylsulphoxide was vigorously stirred at 100°C under a stream constituted by a CO and O$_2$ mixture, containing 18% by moles of O$_2$, at the pressure of 3.5 kg/cm$^2$. (Flow rate equal to 50 ml/$h$ at normal conditions).

1 mmole of CO$_2$ and 6.2 mmoles of propylenethiocarbonate were formed on the whole after 8 hours. The yield on reacted CO was 86%.

EXAMPLE 4

5 mmoles of 2-mercaptoethanol and 1 mmole of triethylamine were dissolved into 10 ml of tetrahydrofuran, 1 mmole of amorphous selenium was suspended therein. The suspension was vigorously stirred at 25°C under a stream constituted by a CO and O$_2$ mixture, containing 18% by moles of O$_2$, at the total pressure of 3.5 kg/cm$^2$. (Flow rate equal to 50 ml/h at normal conditions). The exhaust gases did not contain CO$_2$. 3 mmoles of ethylenethiocarbonate were formed after 8 hours.

EXAMPLE 5

In 10 ml of tetrahydrofuran were dissolved 4.22 mmoles of (HOCH$_2$CH$_2$S—)$_2$, 0.1 ml of triethylamine and 1.4 mmoles of amorphous selenium were added. The suspension was kept under stirring at 50°C for 8 days under a CO pressure of 3 kg/cm$^2$. In the solution, 3.9 mmoles of ethylenethiocarbonate were at last identified. The yield was 92.5% with respect to disulphide.

What we claim is:
1. Process for the production of cyclic thiocarbonates having the formula

wherein A is a divalent alkyl radical having from 2 to 5 carbon atoms, separating the oxygen and sulfur atoms by two carbon atoms, characterized in that a thioglycol or a hydroxydisulphide having the general formula HO—A—SX, wherein X is a hydrogen atom or a radical —S—A—OH, wherein A is as defined above, is reacted with carbon mon-oxide and oxygen in the presence of a catalyst selected from Ni(CO)$_4$, Co$_2$(CO)$_8$, Fe(CO)$_5$, Mn(CO)$_6$ and Se(CO).

2. Process according to claim 1 characterized in that the reaction is carried out at pressures ranging from 1 to 80 atmospheres.

3. Process according to claim 1 characterized in that the reaction temperature ranges from the room temperature to 150°C.

4. Process according to claim 1 characterized in that the reaction is carried out in presence of a solvent selected among pyridine, dimethylformamide, dimethylsuphoxide, tetrahydrofuran, dioxane, halogenated hydrocarbons.

5. Process according to claim 1 characterized in that the reaction is carried out in presence of a solvent comprising an aromatic hydrocarbon and an organic base.

* * * * *